United States Patent
Pannert et al.

(10) Patent No.: US 6,266,004 B1
(45) Date of Patent: Jul. 24, 2001

(54) RADAR METHOD USED IN A MOTOR VEHICLE

(75) Inventors: Wolfram Pannert, Aalen; Dieter Mann, Senden; Wieland Jacobi, Ulm; Wolfgang Wittekind, Nersingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/315,065

(22) Filed: May 20, 1999

(30) Foreign Application Priority Data

May 20, 1998 (DE) .............................................. 198 22 622

(51) Int. Cl.[7] .............................. G01S 13/93; G01S 13/32
(52) U.S. Cl. ................................ 342/70; 342/71; 342/89; 342/92; 342/93; 342/104; 342/105; 342/118; 342/128; 342/159; 342/175; 342/195; 342/196
(58) Field of Search .................................. 342/61, 70–72, 342/104, 105, 192–197, 27, 28, 118–128, 106–117, 159–169, 175, 89, 90, 91, 92, 93

(56) References Cited

U.S. PATENT DOCUMENTS 5,481,268 * 1/1996 Higgins ..................................... 342/70
5,508,706  4/1996 Core et al. .
5,587,713 * 12/1996 Pfizenmaier et al. .................. 342/70

FOREIGN PATENT DOCUMENTS 4243527  1/1996 (DE) .
WO 9514939  6/1995 (WO) .

* cited by examiner

Primary Examiner—Bernarr E. Gregory
(74) Attorney, Agent, or Firm—Venable; Robert Kinberg

(57) ABSTRACT

The invention relates to a radar method for an automatic intelligent traffic control (AICC) in a motor vehicle. The use of a frequency modulation continuous wave method (FM-CM) is suggested in order to securely detect the distance to, relative speed and angle of a preceding motor vehicle. It is furthermore suggested according to the invention that when using an A/D converter 5 with 8-bit resolution, the necessary dynamics are generated by means of a level switchover, that the R, V information is generated in FFTs [Fast Fourier Transformations] 6 with blocked R and V-FFTs, that the useful signals are separated from the noise in a detection device 7 by means of a R-dependent adaptive CFAR threshold, that in a track formation 8, the detection is directly assigned to the tracks and that the association of a detection i to a track j is in the process computed as probability r (i, j).

2 Claims, 1 Drawing Sheet

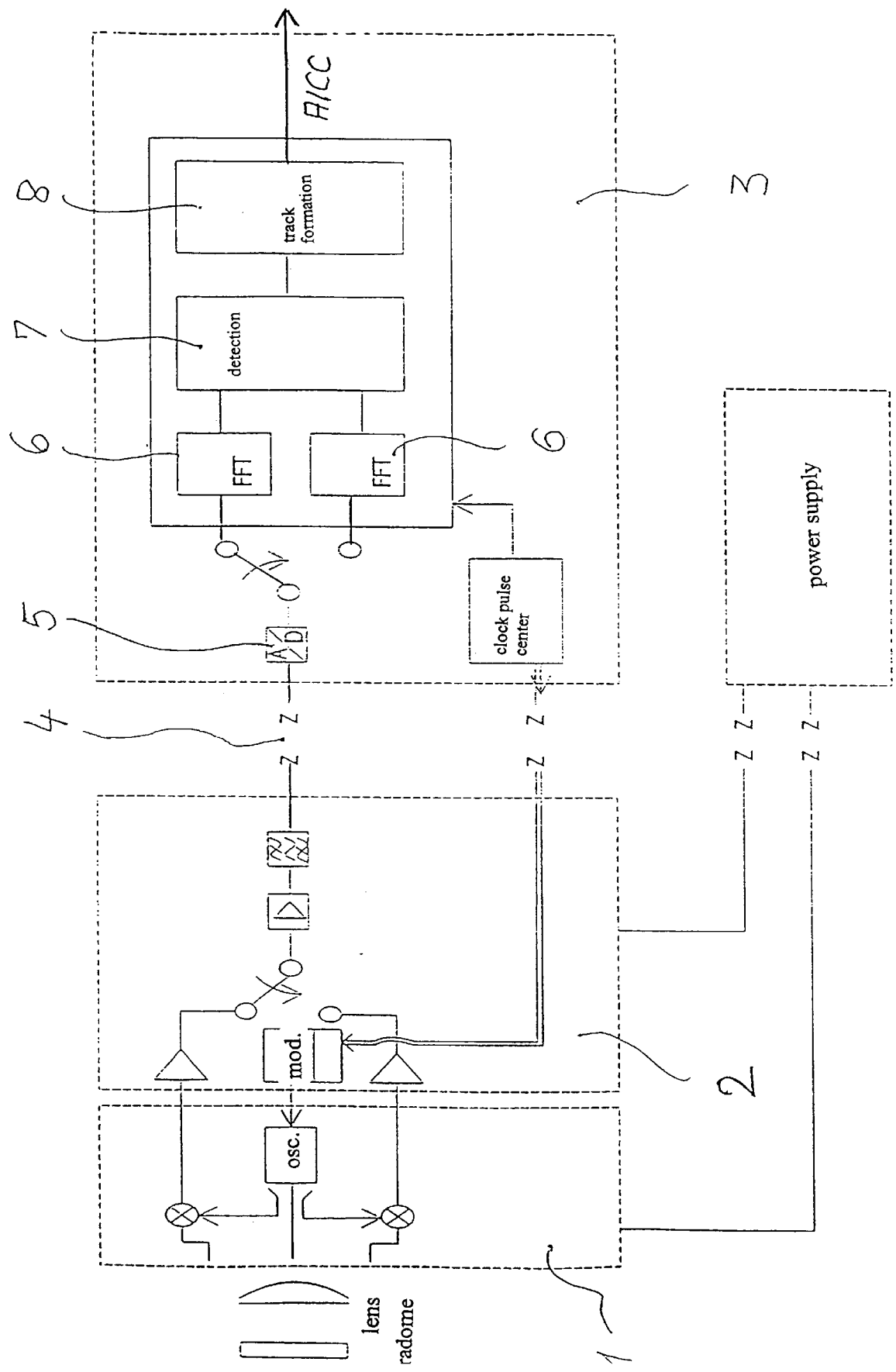

RADAR METHOD USED IN A MOTOR VEHICLE

CROSS-REFERENCE TO RELATED APPLICATION

This application claims the priority of German Patent Application No. 198 22 622.5 filed May 20, 1998.

BACKGROUND OF THE INVENTION

The invention relates to a radar method used in a motor vehicle for an automatic, intelligent traffic flow control (AICC).

The characteristics and design of known radar devices in motor vehicles are essentially defined by the use of pulse radar. The known systems make use of involved and cost-intensive multipath systems to detect several measuring variables,.

A high-resolution radar method is described in the previously filed German patent application 197 32 509.2, which is based on a frequency-modulated, continuous-wave (FM-CW) method with saw-tooth modulation to achieve a simultaneous resolution of the radar scene with respect to distance and relative speed. With this method, the radar echo is mixed at the transmitting reference to form the baseband signal. The method is distinguished in that:

The baseband signal of each modulation period is digitized in an analog/digital converter and is converted to distance/time values by means of a N-point Fourier Transformation;

this conversion is repeated for M modulation periods that follow successively in time;

the determined distance values for each modulation period are stored in a line, assigned to the respective modulation period, of a two-dimensional data memory;

the stored distance/time values are subjected in columns to an M-point Fourier Transformation to form relative speed values and that a distance/speed matrix of the observed radar scene is generated in this way.

This method provides for a frequency-dependent and thus also distance-dependent level compensation in the analog portion of the radar sensor, or a frequency limitation of the baseband signals to higher frequencies by utilizing an anti-aliasing filter that is connected in series before the A/D converter. One embodiment of the method provides that of the N distance/time values, determined with the N-pointed Fourier Transformation, only $N_R<N/2$ values are stored and processed for the subsequent signal processing. The Fourier Transformations used (e.g. the Fast Fourier Transformation (FFT)) operate with suitable data windows to reduce minor lobes to a preset value for the resolution cells of the distance/speed matrix.

SUMMARY OF THE INVENTION

It is the object of the invention to create a cost-effective radar method for an AICC in a motor vehicle, which makes it possible to have radar systems using little space. The radar method is designed to detect the distance, the relative speed and the angle to preceding motor vehicles and to process these values for use in an AICC.

The solution according to the invention is provided by a radar method used in a motor vehicle for an automatic, intelligent communication control (AICC), characterized in that a FM-CW method is used, that when using an A/D converter 5 with 8-bit resolution, the necessary dynamic is generated with a level switchover, that the R, V information is generated in FFTs 6 with blocked R and V FFTs, that the useful signals are separated from the noise in a detection 7 by means of a R-dependent, adaptive CFAR threshold, that in a track formation 8 the detection is assigned directly to the tracks, and that in the process, the assigning of a detection i to a track j is computed as probability r(i,j). The crosstalk noise from the transmitting range and the receiving range, which is standard for short distances, is compensated in two stages.

BRIEF DESCRIPTION OF THE DRAWINGS

One exemplary embodiment of the invention is explained in further detail in the following with the aid of the drawing. FIG. 1 shows a block diagram of the radar method according to the invention.

DETAILED DESCRIPTION OF THE INVENTION

The block diagram shown in FIG. 1 contains the analog signal modules, standard for a FM-CW radar sensor, comprising a HF block 1 and a video/mod printed circuit board 2. The digital signal processing occurs on a DSP circuit board 3. The signal input of this board is supplied via a cable connection 4 with the analog signal of the radar scene, which is determined by the radar sensor. On the DSP circuit board 3, the analog signal is digitized in an A/D converter 5.

The method according to the invention uses a radar sensor with cost-effective A/D converter 5 with 8-bit resolution for a scanning rate of 2 Mhz in order to convert the analog measured values from the radar sensor. A level switchover for the A/D converter is implemented into the method to ensure the necessary dynamic of more than 50 db with this low bit number. This level switchover is triggered by the signal amplitude behind the A/D converter 5. If a threshold value is exceeded within a specified time interval of a predetermined number of values, then an analog amplification switchover is triggered on the input side. At the same time, the digital signal is amplified by the same factor, so that the level ratio of the digital processing remains unchanged. The level switchover of the A/D converter 5 is not explained in further detail in FIG. 1 for reasons of clarity.

As is known, the R-/V gates are generated with the FM-CW method via a frequency analysis of the baseband. In the most simple case, the R-/V information is obtained with an M*N points FFT 6, following resorting of the frequency gates. This refers to M ramps and N scanning values for each ramp. The invention, however, calls for a blocked processing with M pieces N-points R-FFTs and $N_r$ pieces M-points V-FFTs The R-FFTs are real and form N/2 valid values; the V-FFTs are complex. The advantage of this processing is that the R gates can be processed selectively ($N_r<N/2$) and that less storage space is needed for the synchro factors of the FFTs 6. The FFTs 6 are realized twice because of the clock pulse switching known in the FM-CW method.

Furthermore, a signal is present in principle for short distance in the FM-CW method, which signal represents the crosstalk noise from the transmitting branch and the receiving branch and is the result of the simultaneous transmitting and receiving operation. The signal normally blocks the gates 1 and 2 (0–10m), or an object is simulated in this way at this location.

According to the invention, this crosstalk noise is compensated in two stages. For $V_{inherent}>15$ km/h, the crosstalk signal (amount) is hard compensated; for $V_{inherent}<15$ km/h, the crosstalk signal (amount) is estimated, and the change in the signal is observed to be able to distinguish slow-moving, real objects at R-gate 1 or 2, e.g. driving in the city, at a traffic light or in a backup, from the crosstalk noise signal.

The R-gates and V-gates from the two FFTs are arranged into a matrix in the detection 7. The power distribution within this R, V matrix is used for the detection of existing objects and the determination of distance and speed. With the method according to the invention, the detection occurs by means of an adaptive CFAR threshold, which separates useful signals from the noise. The threshold is designed to be R-dependent, in order to do justice to the R-dependent noise level. The threshold value for a specific distance for the following cycle is formed through averaging via the V cells, which are below the threshold in the current cycle.

The method according to the invention includes a track formation 8, designed to track individual objects over time and, if they exist, to select objects that are relevant to the problem definition. Several process steps are planned for this:

The initialization of tracks;

The assigning of completed detections to existing tracks;

The filtering/updating of the characteristic values (distance, speed and angle) of a track;

The deleting of tracks, which are no longer supplied with new data; and

The selection/prioritizing of specific tracks based on suitable criteria.

The special feature of the implemented track formation 8 is that it assigns the detection directly to the tracks, without intermediate step. Depending on the method according to the invention, up to nine detections exist even for a point target. Real objects are therefore expanded in the R, V matrix.

Owing to this expansion of real objects, an intermediate step is carried out in known methods, the so-called object formation. This object formation combines related detections and computes respective average values of the characteristic variables for the related object. The tracks are then formed from these objects.

The difficulty with this known track formation in certain situations is that it must be determined what "related" stands for. Complicated methods are required in part to identify as such closely related detections, e.g. belonging to two real objects, since the detections can fuse to form one object.

Detections can also be assigned simultaneously to several tracks for the assigning. According to the invention, the assigning of a detection i to a track j is computed in the track formation 8 as probability r(i,j), which depends on a generalized distance measure.

What is claimed is:

1. A FM-CW radar method for automatic, intelligent communication control in a motor vehicle, comprising:

detecting an analog signal indicating the distance, relative speed and the angle to a preceding motor vehicle using a radar sensor;

transmitting the analog signal to an automatic intelligent converter control circuit having an analog to digital converter;

generating R, V information in FFTs with blocked R and V FFTs in the automatic intelligent converter control circuit;

filtering out noise including cross talk noise using a detection circuit having an R-dependent, adaptive CFAR threshold in the automatic intelligent converter control circuit; and directly assigning detection of a signal i to a track j, which is computed as the probability r(i,j) in a track information circuit in the automatic intelligent converter control circuit.

2. The FM-CW radar method according to claim 1, wherein the crosstalk noise is calculated and compensated for fast moving vehicles, and wherein the crosstalk noise is estimated and compensated for slow moving vehicles.

* * * * *